United States Patent Office 3,351,604
Patented Nov. 7, 1967

3,351,604
COMPOSITIONS OF VINYL HALIDE RESINS, TRIALLYL CYANURATE, AND TRIOCTYL TRIMELLITATES AND CURED PRODUCTS THEREFROM
Moyer M. Safford, Schenectady, and Fred F. Holub, Scotia, N.Y., assignors to General Electric Company, a corporation of New York
No Drawing. Filed July 1, 1965, Ser. No. 468,973
20 Claims. (Cl. 260—31.8)

ABSTRACT OF THE DISCLOSURE

Heat-stable vinyl halide resins are obtained by incorporating triallyl cyanurate, a trioctyl trimellitate and an organic peroxide and heating the mixture at elevated temperatures.

This invention relates to heat-stable plasticized vinyl resins. More particularly, the invention is concerned with vinyl halide resins convertible, e.g., by heat or irradiation to a more heat stable state, comprising on a weight basis (a) 100 parts of a vinyl halide resin, (b) from 10 to 100 parts of a plasticizer comprising a tri-octyl trimellitate, e.g., tri-(2-ethylhexyl) trimellitate (hereinafter for brevity referred to as "TOTM") having the formula

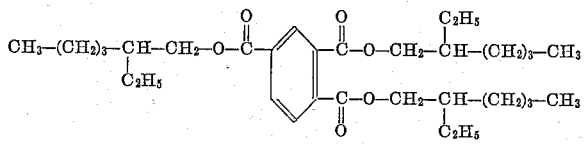

and (c) from 1 to 25 parts triallyl cyanurate. The invention also includes converted, e.g., heat-cured products using organic peroxides, and processes for making these converted compositions.

Vinyl halide resins, for example, polyvinyl chloride, are used extensively as insulation for electrical conductors either directly on the conductor or as an outer covering for already insulated conductors. Many applications for conductors insulated with vinyl halide resins are satisfied by the use of the thermoplastic polymer. However, there are a number of applications where resistance to elevated temperatures is a requirement which the thermoplastic vinyl halide resin cannot satisfy. This is due to the fact that vinyl halide resins, particularly in the plasticized state, begin to soften and readily deform under load usually in the range of 80–125° C., thereby exposing the conductor to the danger of short-circuits.

Many attempts have been made to effect cure or crosslinking of vinyl halide resins. One of these methods involves the use of metal salts such as described in Brous patent, U.S. 2,157,997. However, although such methods of crosslinking do improve the heat resistance of the vinyl halide resin and reduce or eliminate the fusibility and solubility of the polymer, nevertheless caution must be exercised in using these metal salts where stringent electrical properties are a requirement for the insulation. An additional problem which has arisen in the use of these metal salts is the inability to use the more commonly employed plasticizers for the polyvinyl halide resins. Thus, it has been found that the type of plasticizer used has a profound effect on the ability of the metal salt to effect crosslinking or curing of the vinyl halide resin.

To obviate the necessity of using the aforementioned metal salts, suggestions have been made that polyfunctional polymerizable coreactants be employed with the vinyl halide resin and that the ingredients be crosslinked or cured by means of organic peroxides. Thus, U.S. Patents 2,155,591 issued April 25, 1939, U.S. 3,125,546 issued March 17, 1964, and 3,141,850 issued July 21, 1964 disclose the crosslinking of vinyl halide resins using polyfunctional unsaturated coreactants with an organic peroxide. Although the fusion point of the vinyl halide resin is improved by this method and in many instances, the cured polymer will not even soften at temperatures as high as 150–200° C., nevertheless, complications have arisen from two sources. Many of the usually employed plasticizers have again been found to interfere with the cure of the resinous material so that the desired level of cure often is not obtained. In addition, when such cured polymers are subjected to continued heating at temperatures in the neighborhood of 125–150° C., conditions which insulated conductors may have to withstand for long periods of time, there are usually excessive losses in weight resulting in embrittlement of the polymer. This cannot be primarily accounted for by the loss of plasticizer since it has been found that this loss in weight accompanies plasticized cured vinyl halide resin compositions in which plasticizers are employed whose boiling points are well above the temperature at which the cured polymer is heat-aged.

Unexpectedly we have discovered that a certain combination of a vinyl halide resin and a specific plasticizer, namely, the above-mentioned trioctyl trimellitates can be converted to the substantially infusible and insoluble state by organic peroxides to give products which are extremely heat-resistant and show remarkably small weight losses, even after heat-aging for many hours at temperatures of 125–150° C. Despite such heat-aging, the flexibility of conductors insulated with such heat-treated composition is little if any affected by many hours of heat-aging. We have found that these unexpected results are attained by using the trioctyl trimellitates with triallyl cyanurate and the vinyl halide resin, employing for heat-curing purposes the aforesaid organic peroxide. We have also unexpectedly discovered that further improvement is possible in some cases by employing a certain group of stabilizers for the vinyl halide resin without adversely affecting other desirable properties attained by heat-treating the primary mixture of ingredients.

The trioctyl trimellitates employed as plasticizers in the present invention can be obtained by effecting reaction in a solvent such as benzene or ethylene dichloride in the presence of $H_2SO_4$ for 2 to 3 hours, between trimellitic anhydride and an octyl alcohol (including mixtures of octyl alcohols), e.g., n-octyl alcohol, 2-ethylhexanol, iso-octyl alcohol, etc., employing the usual esterification techniques for obtaining the desired trioctyl trimellitate ester. Further directions for obtaining these esters may be found in Bulletin 2571-3–62 issued in 1962 by Amoco Chemicals Corp., 130 E. Randolph Drive, Chicago 1, Illinois, which also supplies these trioctyl trimellitates. The TOTM is a liquid at room temperature having a specific gravity (20/20° C.) 0.9889, a refractive index $n_D{}^{25}$ 1.4824, a viscosity at 20° C. of 300 cps., and boils at about 260° C. at 1 mm. Hg. The triisoctyl trimellitate is a liquid at room temperature, has a specific gravity (20/20° C.) 0.9887, a refractive index $n_D{}^{25}$ 1.4834 and boils at about 274° C. at 1 mm. Hg. Mixtures of trioctyl trimellitates may also be used. Broadly the trioctyl trimellitate may be represented by the formula

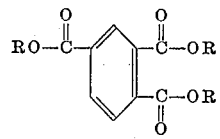

where R is an alkyl radical of eight carbon atoms, e.g., n-octyl, isooctyl, 2-ethylhexyl, etc. The R's may be the same or different.

The vinyl halide resins employed in the practice of this invention comprise the product of polymerization of a mass containing a vinyl halide, especially a predominant proportion of the vinyl halide. Among such compositions are (1) the polyvinyl halides, such as, for example, polyvinyl chloride, polyvinyl bromide, etc.; (2) vinyl resins produced by the conjoint polymerization of a vinyl halide, e.g., vinyl chloride, and a vinyl ester of a lower saturated aliphatic monocarboxylic acid, for instance, vinyl acetate (such as vinyl chloride-vinyl acetate copolymers being available under the trade name of Vinylite resins, wherein the vinyl chloride component is present in a preponderant amount, i.e., greater than 50 weight percent), vinyl propionate, vinyl butyrate, vinyl hexoate, vinyl acetobutyrate, vinyl chloropropionate, etc., it being understood from the foregoing examples that the term "lower saturated aliphatic monocarboxylic acid," embraces ones containing at most six carbon atoms; (3) vinyl resins produced by the conjoint polymerization of a vinyl halide and an acrylic compound, e.g., the copolymers of vinyl chloride with, for example, ethyl methacrylate, methyl methacrylate, benzyl or chlorobenzyl acrylate, methyl chloroacrylate, etc.; (4) copolymers of a vinyl halide, e.g., vinyl chloride, and a vinylidene halide, e.g., vinylidene chloride; and (5) many other vinyl resin copolymers, such as the copolymers of three-component systems, for example, vinyl chloride, vinyl acetate and ethyl methacrylate, etc. As will be understood by those skilled in the art, other multicomponent copolymers may be used, the only requirement being that at least one of the components is a vinyl halide. Further methods of preparation of the vinyl halide resins employed herein and additional examples of vinyl halide copolymers which may be plasticized with the aforementioned trioctyl trimellitate plasticizers may be found in e.g., D'Alelio Patents 2,378,753, issued June 19, 1945, and 2,299,740, issued October 27, 1942, both of which are assigned to the same assignee as the present invention.

In order that those skilled in the art may better understand how the present invention may be practiced, the following examples are given by way of illustration and not by way of limitation. All ingredients listed in the formulation portion of the tables are in parts, by weight, unless otherwise noted.

In compounding the formulations in the following examples, the vinyl halide resin, specifically polyvinyl chloride, triallyl cyanurate, the TOTM, and the di-(α-cumyl) peroxide or tertiary butyl perbenzoate, together with any other ingredients which might be used in the formulation were compounded on heated (about 75–135° C.) differential rolls to obtain a homogeneous composition. Thereafter, each formulation was heated for about 30 minutes at 160° C. in a mold at a pressure of about 1000 p.s.i. gauge pressure, to give a flat sheet suitable for testing.

Example 1

In this example, polyvinyl chloride was mixed with TOTM and triallyl cyanurate and di-(α-cumyl)peroxide employing various stabilizers for the purpose. All the stabilizers are manufactured by National Lead Company. The tribase E employed was basic lead silicate sulfate having a lead content equivalent to 69% PbO. The Tri-Mal stabilizer used is tribasic lead maleate monohydrate and has the formula

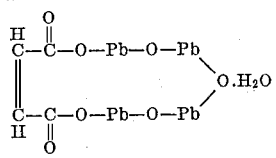

The dibasic lead phthalate stabilizer has the formula

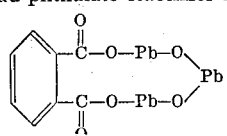

The following Table I shows the ingredients used for each formulation together with the properties of the various heat-treated molded compositions. For comparison one formulation (Sample No. 1) is included to show the effect of omitting a peroxide.

TABLE I

| Ingredients | Formulations | | | | |
|---|---|---|---|---|---|
| | 1 | 2 | 3 | 4 | 5 |
| Polyvinyl chloride | 100 | 100 | 100 | 100 | 100 |
| TOTM | 41 | 41 | 41 | 41 | 41 |
| Triallyl cyanurate | 14 | 14 | 14 | 14 | 14 |
| Tribase E | 10 | 10 | | | 10 |
| Dibasic Pb Phthalate | | | 10 | | |
| Tri-Mal | | | | 10 | |
| Di-(α-cumyl)peroxide | 0 | 1 | 1 | 1 | |
| Tertiary butyl perbenzoate | | | | | 1 |

| | Properties | | | | |
|---|---|---|---|---|---|
| Room temperature tensile (p.s.i.) | 2,854 | 4,040 | 4,380 | 4,527 | 4,047 |
| Room temperature elongation, percent | 252 | 141 | 138 | 145 | 185 |
| Tensile at 125° C. (p.s.i.) | 192 | 520 | 538 | 538 | 420 |
| Percent elongation at 125° C. | 199 | 213 | 173 | 178 | 185 |
| Percent retention elongation at room temperature after 72 hrs./136° C. | | 75 | 106 | 101 | |
| Percent wt. loss after 72 hrs./136° C. | | 1.3 | 1.6 | 1.7 | 2.0 |

Example 2

This example is designed to show the criticality of using triallyl cyanurate in the formulation as contrasted to using other polyfunctional coreactants which might be expected to work but which the applicants have found unexpectedly were not as effective as the triallyl cyanurate. These other coreactants were triallyl phosphate, trimethylolpropane trimethacrylate, trimethylolpropane triacrylate, diallyl phthalate, and diallyl fumarate. The steps of milling of the ingredients, molding of the formulations and testing thereof were the same as those employed in Example 1. Table II below shows the ingredients used in each formulation and the results of each heat-cured sample.

TABLE II

| Ingredients | Formulations | | | | | |
|---|---|---|---|---|---|---|
| | 1 | 2 | 3 | 4 | 5 | 6 |
| Polyvinyl chloride | 100 | 100 | 100 | 100 | 100 | 100 |
| TOTM | 41 | 41 | 41 | 41 | 41 | 41 |
| Di-(α-cumyl) peroxide | 1 | 1 | 1 | 1 | 1 | 1 |
| Triallyl cyanurate | 14 | | | | | |
| Triallyl phosphate | | 14 | | | | |
| Trimethylolpropane trimethacrylate | | | 14 | | | |
| Trimethylolpropane triacrylate | | | | 14 | | |
| Diallyl phthalate | | | | | 14 | |
| Diallyl fumarate | | | | | | 14 |
| Tensile strength (p.s.i.) at 125° C. | 421 | 278 | 388 | 330 | 208 | 150 |
| Percent Elongation at 125° C. | 290 | 183 | 168 | 172 | 220 | 175 |

Example 3

This example shows the unexpected effect of using other commonly employed plasticizers instead of the TOTM. Among the usual plasticizers which might be expected to work and which did not work as effectively as the TOTM were tricresyl phosphate, di-(2-ethylhexyl) phthalate, di-(2-ethylhexyl) sebacate and di-(2-ethylhexyl) adipate. The following Table III shows formulations which were employed and which were milled, heat-treated and tested similarly as in Example 1. Table III also shows the properties of the molded formulations.

Table III

| Ingredients | Formulations | | | |
|---|---|---|---|---|
| | 1 | 2 | 3 | 4 |
| Polyvinyl chloride | 100 | 100 | 100 | 100 |
| Triallyl cyanurate | 14 | 14 | 14 | 14 |
| Tribase E | 10 | 10 | 10 | 10 |
| Di-(α-cumyl) peroxide | 1 | 1 | 1 | 1 |
| Tricresyl phosphate | 55 | | | |
| Di-(2-ethylhexyl) phthalate | | 55 | | |
| Di-(2-ethylhexyl) sebacate | | | 55 | |
| Di-(2-ethylhexyl) adipate | | | | 55 |
| Properties | | | | |
| Tensile strength at 125° C., p.s.i | 222 | 353 | 210 | 287 |
| Percent elongation at 125° C | 262 | 208 | 213 | 233 |
| Percent retention elongation at room temp. after 72 hrs./136° C | 26 | 11 | 9 | 10 |
| Percent weight loss after 72 hrs./136° C | .15 | .24 | .23 | .27 |

Other modifying agents may be added to the mixture of the vinyl halide resin, the trioctyl trimellitate, the triallyl cyanurate and the organic peroxide used in effecting cure of the mixture of ingredients. Among such modifying agents (which may be added in amounts ranging, by weight, from 1 to 50 percent of the vinyl halide resin) may be mentioned, for instance, polyethylene, chlorinated polyethylene (containing amounts of chlorine ranging from about 15 to 45% or more), polypropylene, copolymers of olefins such as copolymers of ethylene and butylene, etc. The following example illustrates various combinations which can be employed in the practice of the applicants' invention.

*Example 4*

In this example, formulations were prepared from polyvinyl chloride, TOTM, triallyl cyanurate and di(α-cumyl)-peroxide, modifying the formulations by the use of varying amounts of chlorinated polyethylene, polyethylene, or a copolymer of ethylene and butylene. In each instance, the formulations were milled, cured in a mold and tested similarly as in Example 1. The following Table IV shows the formulations which were employed in each instance, and the results of tests conducted on the molded samples.

TABLE IV

| Ingredients | Formulations | | | | |
|---|---|---|---|---|---|
| | 1 | 2 | 3 | 4 | 5 |
| Polyvinyl chloride | 60 | 60 | 100 | 100 | 100 |
| TOTM | 20 | 20 | 20 | 20 | 20 |
| Triallyl cyanurate | 10 | 10 | 10 | 10 | 10 |
| Di-(α-cumyl) peroxide | 0 | 1 | 1 | 1 | 1 |
| Chlorinated polyethylene (25% chlorine) | 20 | 20 | 20 | | |
| ¹ Polyethylene | | | | 10 | |
| ² Ethylene Copolymer | | | | | 10 |
| Properties | | | | | |
| Tensile, p.s.i. at 125° C | 33 | 664 | 622 | 648 | 582 |
| Percent elongation at 125° C | 135 | 243 | 245 | 226 | 269 |

¹ Alathon–10 manufactured and sold by E. I. du Pont de Nemours of Wilmington, Delaware.
² Manufactured and sold by Phillips Chemical Company of Bartlesville, Okla.

*Example 5*

When tri-(n-octyl) trimellitate and triisoctyl trimellitate are each substituted for the TOTM in Formulation No. 2 in Example 1, and the formulations are heat-cured in the same manner as in Example 1, cured polyvinyl chloride compositions are obtained exhibiting similar high temperature properties as those of the formulations of Example 1 cured with the di-(α-cumyl) peroxide.

In addition to the di-(α-cumyl) peroxide [or bis-(α,α-dimethylbenzyl) peroxide as it is also known], one can employ other equally effective organic peroxides, preferably those having a decomposition point in excess of about 100° C., in order to minimize loss of effective peroxide content when elevated milling temperatures are employed. A class of peroxides which is especially effecitve in causing the desired crosslinking and attainment of a cured product of improved properties are di(aralkyl) peroxides of the formula

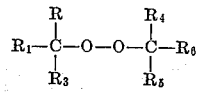

where $R_1$ is aralkyl, $R_2$, $R_3$, $R_4$, and $R_5$ are hydrogen or alkyl groups with less than 4 carbon atoms, and R is aralkyl. $R_2$, $R_3$, $R_4$, and $R_5$ may all be the same or each may be a different group or any two or more may be the same or different. Similarly, $R_1$ and $R_6$ may be the same or different aralkyl groups. Among such peroxides may be mentioned, for instance, dibenzyl peroxide, bis-(α-methylbenzyl) peroxide, bis-(α-ethylbenzyl) peroxide, bis-(α-methylbenzyl) peroxide, bis-(α,α-dimethyl-p-isopropylbenzyl) peroxide, bis-(α,α-dimethyl-p-methylbenzyl) peroxide, etc. Additional examples of the groupings which $R_1$, $R_2$, $R_3$, $R_4$ and $R_5$ may represent and examples of other peroxides within the scope of the above peroxide formula may be found disclosed in U.S. Patent 2,826,570, issued March 11, 1958, which patent by reference is made part of the disclosures of the instant application. The amount of peroxide used may range from 0.1 to 5%, or more, by weight, based on the weight of the vinyl halide resin.

It will of course be apparent to those skilled in the art that other vinyl halide resins and other trioctyl trimellitates may be used in combination with the triallyl cyanurate and the organic peroxide. Many examples of these vinyl halide resins and trioctyl trimellitates have been given above. Copolymers of vinyl chloride and vinyl acetate previously described are advantageously used.

The amount of trioctyl trimellitate plasticizer used in each case can be varied at will and within wide limits, and no intent is to be read into any particular range being limiting, since the properties of the plasticized vinyl halide resins are dependent to a large extent on the amount of plasticizer incorporated. Advantageously, on a weight basis, one can use from 10 to 70%, and preferably from about 25 to 60% of the plasticizer, based on the total weight of the vinyl halide resin and the plasticizer.

The amount of triallyl cyanurate employed may be varied widely. Effective amounts as low as 1 to 5% of the triallyl cyanurate, based on the weight of the vinyl halide resin, exert a significant effect on the final properties of the heat-cured product. Generally, we prefer to employ from about 3 to 25%, by weight, of the triallyl cyanurate, based on the weight of the vinyl halide resin.

If a heat or light stabilizer is employed with the mixture of ingredients prior to heat conversion, it is preferably present in an amount equal from about 0.5 to 15%, by weight, based on the weight of the vinyl halide resin. Although amounts in excess of 15% may be employed, for economical reasons smaller amounts are preferred.

In the compounding of the plastic compositions, for various uses, there may be included, various fillers, such as titanium dioxide, lithopone, etc., as well as small amounts of other common plasticizers, preferably not to exceed 10 weight percent of the weight of the trioctyl trimellitate plasticizer employed. Among such plasticizers may be mentioned, for instance, dioctyl phthalate, tricresyl phosphate, etc. Pigments and other modifying materials which do not have a detrimental effect upon the heat, light and electrical stability of the heat-cured plasticized compositions may also be incorporated. Compound and heat-curing of the compositions can be varied widely. Thus, the curing temperatures may vary from 125 to 250° C. for times of the order of 1 minute to 2 hours or more. Molding pressures of from 5 pounds to 5000 pounds or more may be used. Other molding means in addition to compression molding, such as extrusion, injection, etc., molding, may also be employed.

The claimed plasticized heat-cured composition can be used in various applications particularly where resistance to elevated temperatures is a requirement. In addition to insulating electrical conductors, for instance, copper conductors, aluminum conductors, alloys of copper and aluminum, etc. one can also insulate bus bars. These compositions can be used for encapsulating purposes by molding the mixture of ingredients around various electrical apparatus which requires resistance to heat. The ability to withstand elevated temperatures for long periods of time with relatively little if any change in the flexibility characteristics of the heat exposed product renders these compositions valuable for packaging purposes or for use of the material as heat shield compositions.

We have also discovered that combinations of the vinyl halide resin, the trioctyl trimellitate plasticizer, and the triallyl cyanurate can also be readily converted to the cured, crosslinked state by means of high energy ionizing radiation without the necessity of using organic peroxides. This conversion to the crosslinked state can be effected either in the absence or presence of filler. The various types of ionizing radiation and apparatus suitable for supplying the high energy ionizing radiation, for instance, high energy electrons, is more particularly described in Lawton et al. U.S. Patent 2,997,418, issued Aug. 22, 1961, and assigned to the same assignee as the present invention. By reference this patent is made part of the disclosures of the instant application. In general the energy of electrons employed in the practice of this invention may range from about 50,000 electron volts to 20,000,000 electron volts or higher depending upon the kind of materials being irradiated. The dosage at which measurable infusibility and insolubility of the composition can be induced in the irradiated material generally ranges from $1 \times 10^6$ rep up to as high as $1 \times 10^8$ rep.

Illustrative of the use of high energy ionizing radiation to effect curing of the above-described vinyl halide composition, a mixture of ingredients composed of 100 parts polyvinyl chloride, 41 parts tri-(2-ethylhexyl) trimellitate, 14 parts triallyl cyanurate, and 10 parts Tribase E (described previously) were compounded and molded similarly as in Example 1, and thereafter subjected to irradiation with doses of $5 \times 10^6$ rep and $10 \times 10^6$ rep. The following Table V shows the properties of the irradiated materials, and includes an example for comparison where the mixture of ingredients was not subjected to irradiation.

TABLE V

| Dose | Properties—Room Temperature | |
|---|---|---|
| | Percent Elongation | Tensile, p.s.i. |
| 0 | 264 | 2,897 |
| 5×10⁶ rep | 217 | 3,467 |
| 1×10⁷ rep | 167 | 4,065 |
| | At 125° C. | |
| 0 | 225 | 142 |
| 5×10⁶ rep | 305 | 593 |
| 1×10⁷ rep | 183 | 772 |

These irradiated vinyl halide compositions are useful for packaging purposes and for making electrically insulating tapes for winding around electrical conductors as insulation. Such irradiated compositions can also be used as slot insulation in motors.

What we claim as new and desire to secure by Letters Patent of the United States is:

1. A vinyl halide resin composition of matter comprising on a weight basis (a) 100 parts of a vinyl halide resin selected from the class consisting of homopolymers of vinyl halides and copolymers of a major portion of a vinyl halide with an ethylenically unsaturated monomer copolymerizable therewith, (b) from 10 to 100 parts of a trioctyl trimellitate, (c) from 1 to 25 parts triallyl cyanurate, and (d) from 0.1 to 5 parts of an organic peroxide.

2. The heat-treated product of claim 1.

3. A composition as in claim 1 in which the peroxide is di-(α-cumyl) peroxide.

4. A composition as in claim 1 in which the peroxide is tertiary butyl perbenzoate.

5. A composition as in claim 1 in which the vinyl halide resin is polyvinyl chloride.

6. A vinyl halide resin composition of matter comprising on a weight basis (a) 100 parts polyvinyl chloride resin, (b) from 10 to 100 parts tri-(2-ethylhexyl) trimellitate, (c) from 1 to 25 parts triallyl cyanurate and (d) from 0.1 to 5 parts di-(α-cumyl) peroxide.

7. The heat-cured composition of claim 6.

8. A vinyl halide resin composition of matter comprising on a weight basis (a) 100 parts polyvinyl chloride resin (b) from 10 to 100 parts tri-(n-octyl) trimellitate, (c) from 1 to 25 parts triallyl cyanurate and (d) from 0.1 to 5 parts di-(α-cumyl) peroxide.

9. The heat-cured product of claim 8.

10. A vinyl halide resin composition of matter comprising on a weight basis (a) 100 parts polyvinyl chloride resin, (b) from 10 to 100 parts tri-(2-ethylhexyl) trimellitate, (c) from 1 to 25 parts triallyl cyanurate and (d) from 0.1 to 5 parts tertiary butyl perbenzoate.

11. The heat-treated product of claim 10.

12. A vinyl halide resin composition of matter comprising on a weight basis (a) 100 parts of a vinyl halide resin selected from the class consisting of homopolymers of vinyl halides and copolymers of a major portion of a vinyl halide with an ethylenically unsaturated monomer copolymerizable therewith, (b) from 10 to 100 parts of a trioctyl trimellitate, (c) from 1 to 25 parts triallyl cyanurate, (d) from 0.1 to 5 parts of an organic peroxide, and (e) a heat stabilizer for (a).

13. The heat-treated product of claim 12.

14. A vinyl halide resin composition of matter comprising on a weight basis (a) 100 parts of a vinyl halide resin selected from the class consisting of homopolymers of vinyl halides and copolymers of a major portion of a vinyl halide with an ethylenically unsaturated monomer copolymerizable therewith, (b) from 10 to 100 parts of a trioctyl trimellitate, (c) from 1 to 25 parts triallyl cyanurate, (d) from 0.1 to 5 parts of an organic peroxide, and (e) a minor proportion of (a) of a polymeric composition selected from the class consisting of polyethylene, chlorinated polyethylene, and copolymers of ethylene.

15. The process for making a heat-cured vinyl halide resin which comprises forming a mixture of ingredients comprising on a weight basis (a) 100 parts of a vinyl halide resin selected from the class consisting of homopolymers of vinyl halides and copolymers of a major portion of a vinyl halide with an ethylenically unsaturated monomer copolymerizable therewith, (b) from 10 to 100 parts of a trioctyl trimellitate, (c) from 1 to 25 parts triallyl cyanurate, and (d) from 0.1 to 5 parts of an organic peroxide, and thereafter heating the mixture of ingredients at a temperature sufficiently high to effect crosslinking of the latter.

16. The process for obtaining a heat-cured composition which comprises forming a mixture of ingredients comprising on a weight basis (a) 100 parts polyvinyl chloride resin, (b) from 10 to 100 parts tri-(2-ethylhexyl) trimellitate, (c) from 1 to 25 parts triallyl cyanurate, and (d) from 0.1 to 5 parts di(α-cumyl) peroxide, and thereafter heating the mixture of ingredients at a temperature sufficiently high to effect conversion of the latter to the heat-cured state.

17. The process for obtaining a heat-cured composition which comprises forming a mixture of ingredients comprising on a weight basis (a) 100 parts polyvinyl chloride resin, (b) from 10 to 100 parts tri-(2-ethylhexyl)

trimellitate, (c) from 1 to 25 parts triallyl cyanurate, (d) from 0.1 to 5 parts tertiary butyl perbenzoate, and thereafter heating the mixture of ingredients at a temperature sufficienly high to effect conversion of the latter to the heat-cured state.

18. The process for obtaining a heat-cured composition which comprises in forming a mixture of ingredients comprising on a weight basis (a) 100 parts polyvinyl chloride resin, (b) from 10 to 100 parts tri-(n-octyl) trimellitate, (c) from 1 to 25 parts triallyl cyanurate, (d) from 0.1 to 5 parts di-(α-cumyl) peroxide, and thereafter heating the mixture of ingredients to effect conversion of the latter to a heat-cured state.

19. The process for obtaining a cured vinyl halide polymer composition which comprises irradiating with high energy ionizing radiation a mixture of ingredients comprising on a weight basis (a) 100 parts of a vinyl halide resin selected from the class consisting of homopolymers of vinyl halides and copolymers of a major portion of a vinyl halide with an ethylenically unsaturated monomer copolymerizable therewith, (b) from 10 to 100 parts of a trioctyl trimellitate, and (c) from 1 to 25 parts triallyl cyanurate.

20. A vinyl halide resin composition of matter convertible by high energy ionizing radiation to the cured state comprising on a weight basis (a) 100 parts polyvinyl chloride resin, (b) from 1 to 25 parts triallyl cyanurate and (c) from 10 to 100 parts of a trioctyl trimellitate.

References Cited
UNITED STATES PATENTS 3,149,087  9/1964  Anagnostopoulos et al.
260—884

FOREIGN PATENTS 905,711  9/1962  Great Britain.

OTHER REFERENCES

Chemial Abstracts, vol. 57, col. 15350 h, "Vinyl Plasticizers from Trimellitic Anhydride," by Dougherty et al., 1962.

MORRIS LIEBMAN, *Primary Examiner.*

L. T. JACOBS, *Assistant Examiner.*